S. LIOLIOS.
TIRE.
APPLICATION FILED SEPT. 23, 1915.

1,189,845.

Patented July 4, 1916.

Stephanos Liolios
Inventor,

By Milo B. Stevens & Co.

Attorneys

UNITED STATES PATENT OFFICE.

STEPHANOS LIOLIOS, OF CHARLESTON, MISSOURI.

TIRE.

1,189,845.

Specification of Letters Patent.

Patented July 4, 1916.

Application filed September 23, 1915. Serial No. 52,206.

*To all whom it may concern:*

Be it known that I, STEPHANOS LIOLIOS, a citizen of the United States, residing at Charleston, in the county of Mississippi and State of Missouri, have invented certain new and useful Improvements in Tires, of which the following is a specification.

This invention relates to resilient tires composed of an outer casing and an inner air tube, and its object is to provide a reinforcement and a protecting device for the outer casing whereby the same is given greater wearing qualities.

The object stated is attained by a structure to be hereinafter described in detail, and in order that the same may be better understood, reference is had to the accompanying drawing, in which—

Figure 1:
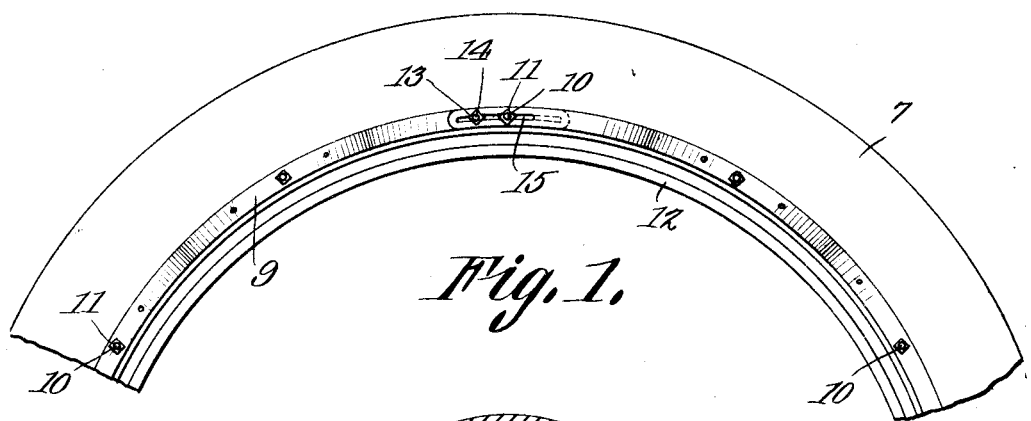
Figure 2:
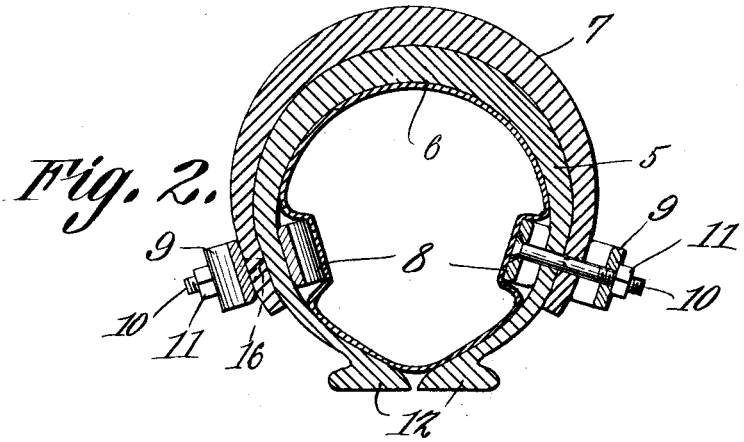
Figure 3:
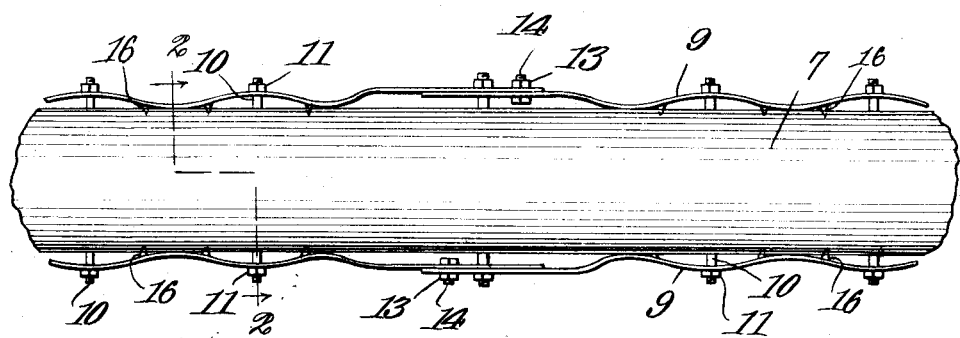

Figure 1 is a side elevation of a fragment of tire showing the application of the invention; Fig. 2 is a cross-section on the line 2—2 of Fig. 3, and Fig. 3 is a plan view of a fragment of the tire and the protecting device.

Referring specifically to the drawing, 5 denotes the outer casing of an ordinary pneumatic tire, constructed and arranged in the usual manner, and as the same is no part of the present invention, a further description is not deemed necessary. The inner tube is shown at 6.

The protecting and reinforcing device for the casing 5 is a cover 7 fitting over the outside thereof and clamped thereto by inner and outer rings 8 and 9, respectively, secured by bolts 10 provided with nuts 11. The cover may be, and preferably is, an outer tire casing, the same as the casing 5, with the clencher flanges at the base removed. The cover therefor extends entirely around the casing 5 and completely covers the sides and the tread thereof. The rings 8 and 9 are opposite each other the rings 8 being inside the casing 5 adjacent to the clencher flanges 12 thereof, and the rings 9 being on the outside of the cover 7 adjacent to the edges thereof. The bolts 10 pass through the rings and also through the casing and the cover, and the nuts 11 are screwed against the outer surface of the rings 9.

The rings 8 and 9 are resilient and at the places where the bolts 10 pass therethrough, they are bowed outward, so that when the nuts 11 are tightened up, the portions of the rings between the bolts in contact with the casing 5 and the cover 7 are drawn together to grip said casing and cover, thereby securely clamping said parts together and preventing the cover from slipping on the casing.

The rings are not continuous, but are divided so that they may be expanded or contracted to suit different sized tires. The ends of the rings overlap and are adjustably secured by nuts 13 screwed on bolts 14 passing through registering slots 15 in the overlapping ends of the rings.

In order to obtain a better hold on the cover 7, the outer rings 9 are provided with inwardly extending prongs 16 which are embedded in the cover when said rings are clamped thereagainst, as hereinbefore described.

I claim:—

1. The combination with the outer casing of a pneumatic tire; of a cover on the outside thereof extending entirely around the same and completely covering the sides and the tread thereof, opposite inner and outer clamping rings for securing the cover to the casing, the inner clamping rings being inside the casing adjacent to the base thereof, and the outer clamping rings being on the outside of the cover adjacent to its edges, prongs on the inner faces of the outer rings adapted to embed in the cover and means for drawing said rings together.

2. The combination with the outer casing of a pneumatic tire; of a cover on the outside thereof extending entirely around the same and completely covering the sides and the tread thereof, opposite inner and outer clamping rings for securing the cover to the casing, the inner clamping rings being inside the casing adjacent to the base thereof, and the outer clamping rings being on the outside of the cover adjacent to its edges, and clamping means passing through the rings and the parts therebetween, the rings being resilient and the portions of the outer rings through which the clamping means pass being bowed outward from the cover.

In testimony whereof I affix my signature in presence of two witnesses.

STEPHANOS LIOLIOS.

Witnesses:
 ED. DAVIS,
 MYRTLE BENNETT.